Aug. 12, 1947.  E. A. STALKER  2,425,651
ROTARY WING SUSTAINED AIRCRAFT
Filed Sept. 11, 1944
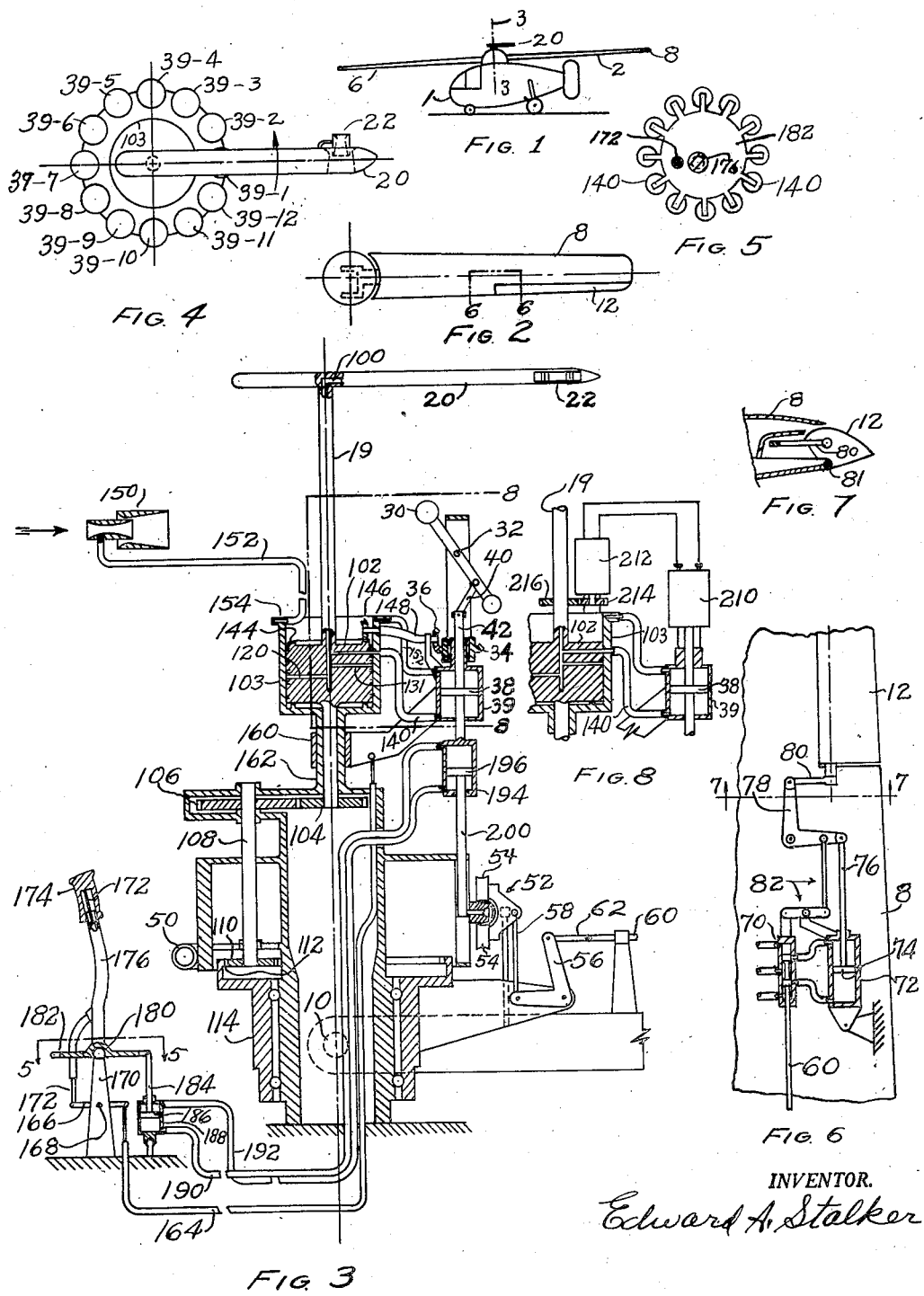
INVENTOR.
Edward A. Stalker Patented Aug. 12, 1947

2,425,651.

UNITED STATES PATENT OFFICE 2,425,651

ROTARY WING SUSTAINED AIRCRAFT

Edward A. Stalker, Bay City, Mich.

Application September 11, 1944, Serial No. 553,652

17 Claims. (Cl. 244—17)

My invention relates to direct lift aircraft particularly. An object is to provide a means of cyclically varying the pitch of each wing in its orbit as a function of the conditions the wing has to meet. Another object is to vary the pattern of cyclic variation automatically as a function of the advance ratio. Another object is to provide a plurality of means of varying the pitch cyclically each of whose actions is superimposable on the other. Other objects will appear from the description and drawings.

I accomplish the above objects by the means illustrated in the accompanying drawings in which—

Figure 1 is a side elevation of the aircraft;

Figure 2 is a fragmentary plan view of a rotor;

Figure 3 is a fragmentary view of the section of the hub and the associated pilot's control, the section being taken along the longitudinal axis of the machine;

Figure 4 is a top view showing diagrammatically the relation of the control arm and the automatic control cylinders;

Figure 5 is a section along the line 5—5 in Figure 3;

Figure 6 is an enlarged fragmentary view of a wing portion indicated by line 6—6 in Figure 2;

Figure 7 is a section along line 7—7 in Figure 6; and

Figure 8 is an alternate form of the invention.

It is customary in contemporary practice to vary the pitch of the wings of a lifting rotor cyclically by means of a circular plate universally mounted. As the advance ratio (ratio of forward speed of the aircraft to tip speed of the blade) increases the plate is tilted to a progressively greater angle. When the plate is substantially perpendicular to the axis of rotation of the wing no cyclic pitch variation is imposed. This is the hovering or vertical climb state of operation.

For translational flight the plate is tilted, imposing a sinusoidal variation in pitch. If the translational speed is increased in relation to the peripheral speed the plate is tilted further. The plate being rigid it imposes equal changes on opposite sides of the axis of rotation for all angles of tilt. This cannot be correct for all advance ratios because as the ratio increases more and more of the inner portion of the retreating wing is in a reversed flow and the outer or tip portion which furnishes lift is shrinking in area. On the other hand the lift is increasing over the whole length of the advancing wing. It is obvious then that as the advance ratio increases the rate of change of pitch of the retreating blade should be different than the rate for the advancing blade. It is also clear that the conventional wabbleplate cannot make the proper relative pitch adjustments as the advance ratio changes.

This invention discloses a device which automatically adjusts the pitch of the wing in various positions independently to values proper for each orbital position.

It is also a feature of this invention that the pitch of the wing in both the front and back positions is adjusted differentially relative to the pitch of the wing in the side positions to compensate for the tilting of the axis of rotation to obtain forward flight.

When the axis of rotation is tilted forward for forward flight, the pitch angle of the advancing blade is decreased but there is an effect of different magnitude on the wing when in the front and back positions. Normally the lift in these positions is too large as compared to the sum of the lifts for the advancing and retreating positions. Thus the lifts of the wing in the front and back positions should both be varied by amounts of the same algebraic sign as a function of the advance ratio. Normally this means that the lifts of the wings in the front and back positions should have their lifts decreased while in the retreating position the lifts should be increased. The invention provides for this variation.

Referring particularly to the drawings, Figure 1 shows a side view of the aircraft composed of the fuselage 1 and the rotor 2. The rotor has two blades 6 and 8 hinged to the hub by the pin 10 for vertical oscillation commonly referred to as flapping. Each blade has a flap 12 hinged along its forward edge for varying the camber of the wings.

Mounted above the rotor on shaft 19 is the control arm 20 carrying the control venturi 22 or other wind pressure detection device, such device thus sensing the relative wind speed of the blade throughout its rotation. The suction generated at the throat of the compound venturi varies with the orbital position of the arm 20 as it moves from advancing to retreating position and back to advancing. This variation in suction is used to control the position of the flap 12 to keep the blades 6 and 8 from flapping beyond a very limited amplitude.

If the blades 6 and 8 were allowed to flap as they proceed about their orbit the blade would assume a position of balance determined by the opposition of the hinge moments due to the lift and the centrifugal force. The lift force varies with the square of the relative velocity while the centrifugal force varies with the angular velocity.

The control device of this invention combines an air force and a centrifugal force which reach a balance in the same manner as the blade would were it allowed to flap. But the control device changes the lift of the blade as a function of the balance so that the blade flaps very little if at all.

The centrifugal force is furnished by the mass 30 hinged at 32 and rotatable about an upright axis by gears 34 and 36. The centrifugal force tends to throw the mass into a horizontal position which tends to move the piston 38 upward due to the connecting link 40 to the piston rod 42. Thus the mass 30 serves as a means of detecting the rate of rotation or of changes therein.

The suction from the venturi 22 is led to the lower side of piston 38 in cylinder 39 so that the position of the piston is determined by the opposition of the suction and the centrifugal force of the mass 30.

There are 12 cylinders 39—1 to 39—12 with their masses 30 disposed about the axis of rotation of the blades as shown in Figure 4. The positions of the pistons vertically determine the attitude of the coiled spring 50 encircling the axis of rotation. The spring constitutes a deformable cam whose contour determines the variation in the blade pitch and lift through variations in the attitude of the flaps 12.

The variation in the flap position is accomplished by the rider 52 whose rollers 54 roll on the surface of the coiled spring cam 50. The vertical movement of the rider as it follows the cam contour actuates the bell crank 56 by the link 58. The crank transmits a spanwise motion to the rod 60 by means of the link 62. The rod 60 controls the balanced valve 70 which sends hydraulic fluid under pressure to the actuating cylinder 72 enclosing the piston 74. The movement of the piston is transmitted to the flap 12 by the rod 76, bellcrank 78 and link 80. The fore and aft motion of link 80 rotates the flap about the axis of the hinge 81. The flap is made to assume a definite position by the follower mechanism 82 which shifts the cylinder of the control valve to the shut-off position when the flap has reached the proper attitude.

It will now be clear that the lift of the rotor blades is made a function of the rate of rotation and the relative wind pressure about the orbit because the contour of the cam 50 is varied according to these quantities.

For a constant ratio of the forward speed and the rate of rotation the cam 50 has a constant contour, but when the ratio assumes a new value, the cam assumes a new contour which will be kept until the ratio changes again. The mechanism for accomplishing this will now be described.

The suction from the throat of venturi 22 is conducted by tube 100 to the piston 102 (in cylinder 103) which is revolved on the upright axis by gears 104 and 106, the latter being turned by the rotor by its shaft 108 and gear 110 meshing with gear 112 on the rotor hub 114. The rotation of piston 102 is therefore coordinated with the rotation of the blades.

The duct 100 has 12 branch ducts 120 to 131 each at a different vertical level. Each duct registers once each revolution with a tube 140 leading from cylinder 103 to the lower end of the cylinder 39. There are thus 12 tubes 140, one for each cylinder 39. During the interval of no registration the tubes 140 are sealed off. Since the venturi is to have a peripheral speed substantially the same as or comparable to the blade tip speed registration occurs many times during one revolution of the blade.

The centrifugal mass is driven from a gear 144 cut in the upper end of piston 102 by means of gear 146 and flexible shaft 148.

The location of the holes in cylinder 103 are not directly in line with the orbital position of the blade whose pitch or lift is to be changed. A certain lead is needed so that the action to change the pitch can be transmitted. Also it is desirable to make a different type of lift change for the front and back blade positions than for the side positions.

When the axis of the rotor is tilted to obtain a forward component the angle of attack of the advancing blade is decreased but there is an effect of different magnitude on the blade in the front and back positions. Actually in order to keep the total lift constant with time it is desirable to reduce the lifts of the blade in the front and back positions. This means a change of like algebraic sign for these positions while for opposite lateral positions the change is of opposite sign. By selecting the proper orbital location of each of the tubes 140 in cylinder 103 the proper change can be made to account for the lag in the mechanism and to accommodate special requirements as those of the front and back positions of the blade.

The action of piston 38 can be augmented by the venturi 150 which would be located facing into the wind due to forward flight. It is connected to the upper ends of cylinders 39 by tubes 152 and manifold 154.

Uniform change of pitch about the orbit is obtained by sliding all twelve cylinders 39 upward or downward with sleeve 160 to which they are bracketed. The sleeve slides on the column 162 and is moved by the Bowden cable 164 running to the lever 166 pivoted at 168 on the control pedestal 170. The lever is actuated by the cable 172 moved by the sliding of the handle 174 on the control stick 176.

Directional control in pitching and rolling is obtained from the normal movements of the stick 176 which is ball socketed at 180. The stick has fixed to it the wabble plate 182 about whose periphery are pivotally attached the piston rods 184 of 12 pistons 186 and cylinders 188. From each cylinder, from above and below the piston, run two tubes 190 and 192 to the top and bottom respectively of the cylinder 194 containing the piston 196. The cylinder 194 is fixed with respect to the piston rod 42, while the piston 196 is integral with the piston rod 200 which at its lower end is pin connected to the cam 50.

When the stick is rotated, as for instance rearward, fluid pressure is transmitted from cylinder 188 to the cylinder 194 which changes the contour of the cam 50 and therefore imposes a pitch or lift change on the blade when in a preassigned orbital position.

As shown in Figure 5 the pivot 180 is not in the center of the plate 182 since a greater displacement is needed to obtain a certain lift change from the retreating blade than from the advancing blade.

All the cylinders are preferably filled with oil to make a rigid mount for the spring 50.

In hovering the blades all assume equal pitches or lifts because the relative wind playing on the venturi 22 is everywhere the same in its orbit.

In an alternate form of the invention the mass 30 is replaced by a solenoid 210 to offer resistance to the piston 38. The strength of the solenoid is varied along its vertical axis and made a function of the rate of rotation by deriving its current from the generator 212 rotated by the rotation of the blades. The connection is made through the gears 214 and 216, the latter fixed to shaft 19.

It will now be clear that I have provided an automatic control mechanism of great flexibility as regards the control of the blades in their respective orbital positions and the changing advance ratio.

The lift of the blade in any position is controlled independently of the control of the blade in any other position. The lift of the blade is changed in any orbital position to meet the aerodynamic condition existing at that orbital position. As the advance ratio changes the device automatically changes the orbital conditions to again make the proper orbital changes in the blade lift.

I have now described suitable embodiments of my invention which are now preferred. It is to be understood however that the invention is not limited to the particular construction illustrated and described and that I intend to claim it broadly as indicated by the scope of the appended claims.

I claim:

1. In combination in an aircraft of the direct lift type, a variable lift blade, means to support said blade for rotation about an upright axis, means to vary the lift of the blade, relative wind responsive means rotatable at a speed coordinated with the rate of rotation of said blade, cam means having a continuously adjustable cam contour, means to vary the contour of said cam means in response to said wind responsive means, and means responsive to contour of said cam means to control said lift varying means to alter the lift of said blade orbitally in accordance with the relative wind effective upon said blade.

2. In combination in an aircraft of the direct lift type, a variable lift blade, means supporting said blade for rotation about an axis to support the aircraft, a cam having a deformable cam contour, a plurality of pressure responsive elements, a source of pressure operating fluid, means connecting each said element to said cam to deform said cam contour by the movements of said elements, a rotating relative wind responsive device rotatable in predetermined relation to the orbital positions of said blade, and means to supply pressure from said source to said elements in accordance with the relative orbital position of said device, means to vary the lift of said blade and means responsive to said cam contour to control the operation of said lift varying means.

3. In combination in an aircraft of the direct lift type, a variable lift blade, means supporting said blade for rotation about an axis to support the aircraft, a cam having a deformable cam contour, a plurality of pressure responsive elements, a source of pressure operating fluid, means connecting each said element to said cam to deform said cam contour by the movements of said elements, a rotating relative wind responsive device rotatable in predetermined relation to the orbital positions of said blade, means to supply pressure from said device to said elements in accordance with the relative orbital position of said device, an inertia element rotating about an axis, means operably connecting said inertia element to said cam to vary its contour in opposition to the deformation caused by said elements, means to vary the lift of said blade, and means responsive to said cam contour to control the operation of said lift varying means.

4. In combination in an aircraft of the direct lift type, a blade, means supporting said blade for rotation about an axis to support the aircraft, means to vary the lift of said blade, a cam having a deformable cam contour, a relative wind speed responsive device, a plurality of operating elements controlled by said device, means connecting each said element to said cam to deform said cam contour by the movment of said elements, means responsive to the speed of rotation of said blade, means connecting said speed responsive means with said elements opposing the movement of said elements by said relative wind speed responsive device, and means registering with said cam contour and operably connected to said lift varying means to vary the lift of the blade in accordance with the variation in cam contour.

5. In combination, in an aircraft of the direct lift type, a variable lift wing, means supporting said wing for rotation about an upright axis to support the aircraft, detection means rotatable in predetermined relation to the rotation of said wing to detect the relative wind speed of said wing at a plurality of points disposed in preassigned order about said axis, a plurality of operating elements disposed in sequence about a circuit each operably connective to said detection means, means to establish operable connections between said detection means at said points and said operating elements, means to vary the lift of said wing, and means controlled by said operating elements for controlling said lift varying means to alter the lift of said wing in accordance with the relative wind speed at each said point.

6. In combination in a direct lift aircraft, a blade, means to support said blade for rotation about an upright axis, adjustable means for varying the lift of the blade, means continuously responsive to the ratio of the relative air speed of the blade to its peripheral speed throughout its orbit at each point thereof substantially independently of adjacent points, means operably connected to said adjustable means to control the variation of the blade lift in response to the orbital positions of said blade, and means controlled by said ratio responsive means to modify said control means differently in different portions of the orbit to provide continuous control of the blade lift in accordance with the varying relative wind conditions of the blade throughout its orbit.

7. In combination in a direct lift aircraft, a blade, means to support said blade for rotation about an upright axis, means to vary the lift of said blade, means continuously responsive to the ratio of the relative air speed of the blade to its peripheral speed throughout its orbit, means responsive to the orbital position of said blade for controlling said lift varying means to increase the lift of the blade in the retreating position relative to that in the advancing position, and means controlled by said ratio responsive means for controlling said lift varying means to cause a change in the lift of the blade in adjacent orbital quadrants thereof in correlated relation with a change in said ratio.

8. In combination in a direct lift aircraft, a blade, means to support said blade for rotation about an upright axis, means to vary the lift of said blade, means responsive to the forward speed of the aircraft, means responsive to the relative wind velocity of the blade continuously throughout its orbit, means for differentially correlating the action of said two responsive means, substantially throughout the orbit of said blade, and means controlled in accordance with said differential means for controlling the adjustment of said lift varying means to provide for adjustment of the lift of said blade at each point throughout its orbit independently of the lift at any other point.

9. In combination in an aircraft of the direct-lift type, a variable lift blade, means supporting said blade for rotation about an axis to support the aircraft, cam means having a variable camming surface contour, means to adjust the contour of said camming surface substantially continuously throughout its circumference, means responsive to the relative wind speed of said blade throughout its rotation, means controlled by said responsive means for operating said adjusting means to vary the contour of said camming surface circumferentially in relation to the relative wind speed of said blade, and means controlled by said cam means and operably connected to said blade to vary the lift of said blade.

10. In combination in an aircraft of the direct lift type, a variable lift blade, means supporting said blade for rotation about an axis to support the aircraft, cam means having a variable camming surface contour, means to deform the contour of said camming surface at a series of points around its periphery independently of the deformation at any other point, means responsive to the relative wind speed of said blade at a series of points throughout its rotation, means controlled by said responsive means for operating said adjusting means to deform the contour of said camming surface circumferentially in relation to the relative wind speed of said blade, and means controlled by said cam means and operably connected to said blade to vary the lift of said blade in accordance with said camming surface contour.

11. In combination in an aircraft of the direct lift type, a variable lift blade, means supporting said blade for rotation about an axis to support the aircraft, cam means having a variable camming surface contour, means to adjust the contour of said camming surface substantially continuously throughout its circumference, means responsive to the relative wind speed of said blade throughout its rotation, means controlled by said responsive means for operating said adjusting means to vary the contour of said camming surface circumferentially in relation to the relative wind speed of said blade, means controlled by said cam means and operably connected to said blade to vary the lift of said blade, and manual means to superimpose an alteration of contour on said camming surface to direct the flight of said aircraft.

12. In combination in an aircraft of the direct lift type, a variable lift blade, means supporting said blade for rotation about an axis to support the aircraft, means for detecting the relative wind velocity at a plurality of points in the orbit of said blade, a plurality of fluid pressure responsive devices, a source of fluid operating pressure, means operably connecting said detecting means and said responsive devices to direct fluid pressure from said source to said devices to provide for individual adjustment in the positions thereof as determined by said detecting means, and means operably connecting said responsive devices with said blade to vary its lift in response to variation in the relative wind velocity at each of said plurality of points.

13. In combination in an aircraft of the direct lift type, a variable lift blade, means supporting said blade for rotation about an axis to support the aircraft, cam means having a variable camming surface contour, means to adjust the contour of said camming surface substantially continuously throughout its circumference, means responsive to the relative wind speed of said blade throughout its rotation, means responsive to the speed of rotation of said blade, means controlled by both said responsive means for operating said adjusting means to vary the contour of said camming surface circumferentially in relation to the relative wind speed of said blade, and means controlled by said cam means and operably connected to said blade to vary the lift of said blade.

14. In combination in an aircraft of the direct lift type, a variable lift blade, means supporting said blade for rotation about an axis to support the aircraft, cam means having a variable camming surface contour, means to adjust the contour of said camming surface substantially continuously throughout its circumference, means responsive to the relative wind speed of said blade throughout its rotation, means responsive to the forward speed of the aircraft, means controlled by both said responsive means for operating said adjusting means to vary the contour of said camming surface circumferentially in relation to the relative wind speed of said blade, and means controlled by said cam means and operably connected to said blade to vary the lift of said blade.

15. In combination in a direct lift aircraft, a rotatable blade, means supporting said blade for rotation about an upright axis, adjusting means for varying the lift of said blade, means for sensing the relative wind speed at at least one point in each quadrant of the orbit about said axis, means corresponding to each of the points sensed by said sensing means and actuated by said sensing means in accordance with the relative wind at each said point, and means operably connected to said actuating means and to said blade adjusting means to effect adjustment of the lift of said blade at all points of its orbit in corresponding relation to the magnitudes of the relative wind at each said point.

16. In combination in a direct lift aircraft, a rotatable blade, means supporting said blade for rotation about an upright axis, adjusting means for varying the lift of said blade, means for sensing the relative wind speed at at least one point in each quadrant of the orbit about said axis, means corresponding to each of the points sensed by said sensing means and actuated by said sensing means in accordance with the relative wind at each said point, means operably connected to said actuating means and to said blade adjusting means to effect adjustment of the lift of said blade at all points of its orbit in corresponding relation to the magnitudes of the realtive wind at each said point, and means for rotating said sensing means more rapidly than the rate of rotation of said blade to develop a plurality of sensing actions for each blade rotation to effect accurate control of the blade lift.

17. In combination in a direct lift aircraft, a blade, means supporting said blade for rotation about an upright axis, adjustable means for varying the lift of the blade, a device for sensing the relative air speed at at least one point in each quadrant of an orbit about said axis, and means operably connected to said sensing device and said adjustable means to change the lift of said blade continuously throughout its orbit according to the magnitude of the relative wind velocity sensed at each said point in said quadrants independently of the relative wind conditions in said other quadrants.

EDWARD A. STALKER.

REFERENCES CITED

The following references are of record in the file of this patent:

UNITED STATES PATENTS

| Number | Name | Date |
|---|---|---|
| 1,900,689 | Baum | Mar. 7, 1933 |
| 1,982,968 | Stalker | Dec. 4, 1934 |
| 1,982,969 | Stalker | Dec. 4, 1934 |
| 1,254,496 | Goldsworthy | Jan. 22, 1918 |
| 2,389,798 | Main | Nov. 27, 1945 |
| 2,356,692 | Platt | Aug. 22, 1944 |